United States Patent
Scolari et al.

(10) Patent No.: US 9,010,818 B2
(45) Date of Patent: Apr. 21, 2015

(54) SINGLE HANDLE POST HOLE DIGGER

(71) Applicants: Nathan A. Scolari, Grenville, SC (US); Kevin Thomas Dubis, Summerville, SC (US); Charles Stanley Dubis, Greenville, SC (US)

(72) Inventors: Nathan A. Scolari, Grenville, SC (US); Kevin Thomas Dubis, Summerville, SC (US); Charles Stanley Dubis, Greenville, SC (US)

( * ) Notice: Subject to any disclaimer, the term of this patent is extended or adjusted under 35 U.S.C. 154(b) by 0 days.

(21) Appl. No.: 13/940,636

(22) Filed: Jul. 12, 2013

(65) Prior Publication Data

US 2014/0015268 A1 Jan. 16, 2014

Related U.S. Application Data

(60) Provisional application No. 61/671,151, filed on Jul. 13, 2012.

(51) Int. Cl.
 *A01B 1/02* (2006.01)
 *A01C 5/02* (2006.01)
 *E21B 11/00* (2006.01)

(52) U.S. Cl.
 CPC ... *A01B 1/02* (2013.01); *A01C 5/02* (2013.01); *E21B 11/005* (2013.01)

(58) Field of Classification Search
 USPC ........ 294/50.8, 50.9, 209; 172/371, 372, 378, 172/390; 254/132
 See application file for complete search history.

(56) References Cited

U.S. PATENT DOCUMENTS

| | | | | |
|---|---|---|---|---|
| 281,193 | A | | 7/1883 | Kohler |
| 394,322 | A | * | 12/1888 | Atkinson ............ 294/50.8 |
| 652,077 | A | * | 6/1900 | Burson ............ 294/50.8 |
| 682,021 | A | * | 9/1901 | Bennett ............ 294/50.8 |
| 819,791 | A | | 5/1906 | Neste |
| 856,066 | A | | 6/1907 | Jenney |
| 1,187,316 | A | * | 6/1916 | Higby ............ 294/50.8 |
| 1,322,920 | A | | 11/1919 | Malbon |
| 1,360,120 | A | * | 11/1920 | Lambert ............ 294/50.8 |
| 1,428,202 | A | | 9/1922 | Arndt |
| 1,706,332 | A | * | 3/1929 | Theriot ............ 294/50.8 |
| 1,888,929 | A | * | 11/1932 | McDowell ............ 294/50.8 |
| 2,028,680 | A | | 1/1936 | Mayeda |
| 2,155,839 | A | * | 4/1939 | Pride ............ 294/50.8 |
| 2,710,765 | A | | 6/1955 | Arens |
| 4,042,270 | A | | 8/1977 | Weiland |
| 4,283,757 | A | | 8/1981 | Nalbandian |
| 4,905,768 | A | * | 3/1990 | Lorenz ............ 172/25 |
| 5,427,424 | A | | 6/1995 | Robinson |
| 5,478,128 | A | * | 12/1995 | Aaland ............ 294/50.8 |
| 5,615,541 | A | | 4/1997 | Ota |
| 6,439,629 | B1 | | 8/2002 | Bieth |
| 7,798,545 | B2 | | 9/2010 | Norton |

FOREIGN PATENT DOCUMENTS

GB 800480 8/1958
WO WO0111939 2/2001

* cited by examiner

*Primary Examiner* — Paul T Chin
(74) *Attorney, Agent, or Firm* — McNair Law Firm, P.A.; Douglas W. Kim

(57) ABSTRACT

The present invention is directed to a single handle post hole digger. The single handle of the post hole digger includes an outer elongated vertical handle and an inner elongated vertical shaft that is located within the outer handle. The post hole digger includes two blades used to cut into the ground and to loosen soil when open and then used to capture and remove soil when closed. The single handle configuration allows for deeper holes as the holes do not have to accommodate the opening action of the handles as in traditional diggers.

18 Claims, 17 Drawing Sheets

SINGLE HANDLE POST HOLE DIGGER

FIELD OF THE INVENTION

The present invention relates to a new type of post hole digger and more specifically to a light-weight, single handle post hole digger.

BACKGROUND

Post hole diggers known in the art are generally configured with two elongated handles connected to two blade members through a pivoting joint. To operate a traditional post hole digger, a user holds one elongated handle in each hand and thrusts the post hole digger into the ground to loosen the soil and then uses the two elongated handles to close the two blade members thereby capturing and holding the soil. The user next removes the post hole digger containing the captured soil out from the hole and opens the handles allowing the soil to fall outside and away from the hole.

There have been many improvements and adaptations to post hole diggers over the years. For example, U.S. Pat. No. 7,798,545 discloses a post hole digger comprising two uniquely shaped elongated handles connected to a blade assembly. The uniquely shaped handles act to reduce the size of the post hole digger in both its open and closed positions and thereby allowing a user to dig more narrow and steep sided holes.

Despite the many improvements to post hole diggers over the past century, most post hole diggers on the market today utilize a two handle design and offer many disadvantages to the end user. First, using two handles forces a user to spread their arms at an uncomfortable distance when thrusting the digger into the ground and when removing soil. This puts a user's arms, back, and neck into an unnatural position causing fatigue and stress to the body. The two handle design also makes it difficult for more than one person to operate the digger. Second, traditional post hole diggers require a great deal of effort by the user to maintain the blades in a closed position while removing heavy loads of soil. Third, the depth of a hole is limited by the design of traditional two handle post hole diggers which require the two handles to be spread apart by a certain degree in order to open or close the blade members.

There is therefore a great need in the field for a new type of post hole digger which is comfortable to use, may be used simultaneously by more than one person, provides a means to lock the blades into position when removing heavy loads of soil, and which is able to dig a deep hole without being limited by the configuration of the post hole digger handles.

BRIEF SUMMARY OF THE INVENTION

The present invention is a light-weight, single handle post hole digger. The single handle of the post hole digger is generally comprised of an outer elongated vertical handle and an inner elongated vertical shaft located substantially within the outer handle. The post hole digger of the present invention has two blade members used to cut into the ground and to loosen soil when in an open configuration and then used to capture and remove soil when in a closed configuration, in some embodiments, a first stationary blade member is permanently attached to the inner elongated vertical shaft by an adjustable pin or bolt and a second movable blade member is connected to the outer elongated handle via a connection rod. The post hole digger of the present invention is configured so that users may comfortably hold the outer handle with one hand and the top portion of the inner shaft with the other hand, thrust the post hole digger into the ground to loosen soil and debris and then twist or rotate their hands thereby turning the outer handle causing the movable blade member to change configurations (i.e.; change from an open to a closed position or a closed to an open position). In some further embodiments, the post hole digger of the present invention comprises a locking assembly configured to temporally restrict or arrest the rotation of the outer handle and therefore holding the movable blade in either a closed or open configuration. In yet further embodiments, the post hole digger of the present invention comprises one or more extension members allowing the vertical length of the single handle to be extended and providing a means for a user to dig extremely deep holes by adding extension members to the single handle of the post hole digger. Extension members can be added to the inner stationary handle and the outer movable handle.

The invention can include a handle assembly having an outer handle having a bore for receiving an inner shaft, said inner shaft having an upper distal portion extending outwards from said outer handle and a lower portion extending outward from a proximal portion of said outer handle; a movable blade pivotally attached to said lower portion allowing said movable blade to pivot about said lower portion between an open position and a closed position; a second blade attached to said lower portion; and, a linkage assembly connected to said outer handle at a sleeve pivot connection and connected to said movable blade at a blade pivot connection so that when said outer handle is rotated about said inner shaft, said movable blade moves between said open position and said closed position.

The invention can include a link bar connected between said sleeve pivot connection and said blade pivot connection and can include a link spacer in said link arm so that the length of said link arm can be adjusted thereby modifying the distance that the movable blade travels when moving between said open position and said closed position. A second linkage assembly connected to said outer handle can be included wherein, said second blade is pivotally connected to said lower portion of said inner handle so that when said outer handle is rotated about said inner shaft, said blades move between said open position and said closed position.

A locking assembly can be carried by said outer handle for locking said inner shaft thereby preventing said inner shaft from rotating within said outer handle. The locking assembly can include a compression member carried by said outer handle; a lock base attached to said outer handle; and, a lock nut carried by said outer handle so that when said lock nut is engaged with said lock base, said compression member presses against said inner shaft to restrict said inner shaft from rotating within said outer handle.

The invention can include an inner extension connected to said upper distal portion thereby extending said inner handle and an outer extension connected to said outer handle thereby extending said outer handle and allowing for a deeper hole to be produced.

A step can be connected to said outer handle. The step can be slidably attached to said outer handle, thereby allowing said step to be positioned along the outer handle. The step can be pivotally connected to said outer handle and includes a retracted position and an extended position. The step can encircle said outer handle.

The invention can include a light source that can be carried by said inner shaft for providing light toward said blades; a power source carried by said outer handle in electrical communications with said light source; and, a switch for actuating said light source to provide light to a working area. The light source can be attached to said lower portion of said inner shaft disposed between said blades. The switch can be an accelerometer actuated by impact of said blades against the ground where the light can be kept actuated for a predetermined period of time upon actuation by an integrated circuit in electrical communication with said switch and said light.

BRIEF DESCRIPTION OF THE DRAWINGS

The present invention is illustrated by way of example and not limited by the figures of the accompanying drawings, in which like references indicate similar elements and in which.

DETAILED DESCRIPTION OF THE INVENTION

Figure 1:
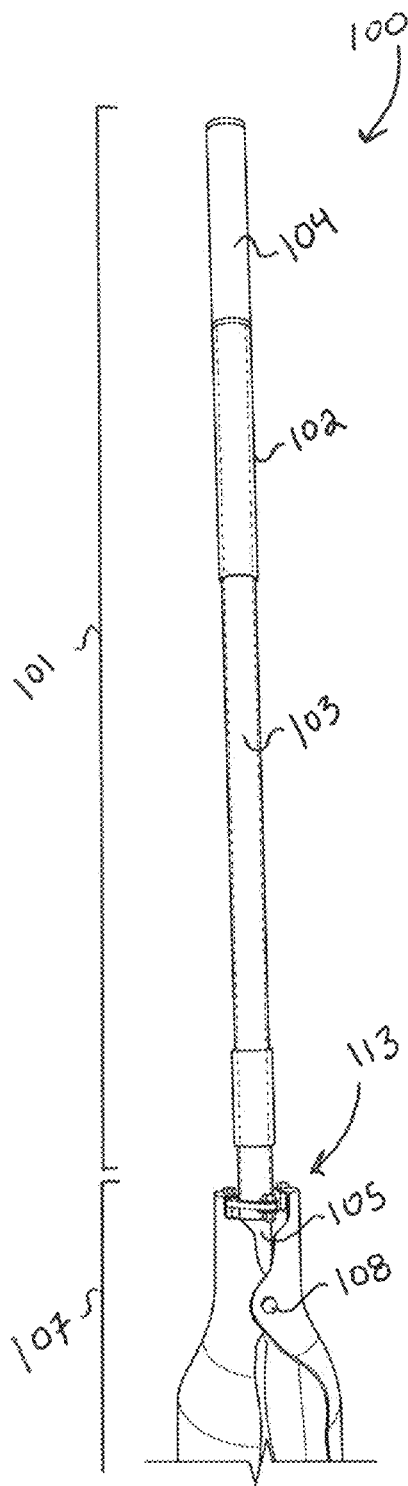
FIG. 1 shows a perspective view of aspects of the invention.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As used herein in some examples only the following terms shall be defined. An "offset pivot point" means a configuration wherein one end of a single-team post hole digger handle assembly (inside handle assembly) and associated blades may be, and generally are, disposed on the center of the "offset pivot point", the "offset pivot point" being located on one or more structures such that one spade is extending toward the opposing spade. Pivot point means a configuration comprising a rotating iron threaded reducer and a connecting pin coupled to the iron threaded reducer, such that the iron threaded reducer and pin will turn in a left or right circular direction by means of turning outside handle assembly in a left or right circular direction. As used herein, "coupled" means a link between two or more elements, whether direct or indirect, so long as a link occurs.

As used herein, "directly coupled" means that two elements are directly in contact with each other.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new post hole digger is described herein. In the following description, for purposes of explanation, numerous specific details are set forth in order to provide a thorough understanding of the present invention. It will be evident, however, to one skilled in the art that the present invention may be practiced without these specific details.

As perhaps best shown by FIG. 1, one example of a single handle post hole digger 100 according to the present disclosure is shown. A single handle assembly 101 is generally comprised of an elongated outer handle portion 102 (sometimes called "outer handle") and an inner elongated shaft portion 103 (sometimes called "inner shaft"). In some preferred embodiments, substantially all of the inner shaft 103 is located within the outer handle 102. In some embodiments, a small distal portion 104 of the inner shaft 103 protrudes up and away from the top of the outer handle 102. According to the present example, the inner shaft 103 has an upper distal portion 104 and a lower portion 105 connected to a blade assembly 107 by a connection bolt 108. The lower portion of the inner shaft 105 may be permanently or temporarily coupled with the inner shaft 103 for example through a connection assembly 113.

In some embodiments, the single handle assembly 101 is generally configured to be about 4-8 feet in vertical length allowing a user (typically a male adult) to comfortably grasp the handle in a standing position with arms extended slightly out in front of the chest. In some further embodiments, the inner shaft 103 is made from a metal, wood, or plastic material such as an iron, fiberglass or PCV pipe. In other further embodiments, the outer handle 102 is made from a metal or plastic material such as a hollow PVC pipe. Both the outer handle and the inner shaft are designed to be light weight yet strong enough to support repeated thrusting of the post hole digger into the ground.

The blade assembly 107 is comprised of two blade members (sometimes called "blades" or individually "blade"). Each blade can be of traditional design and material known in the art of post hole diggers. The blades are used to loosen, capture, and remove soil from the ground.

Figure 2:
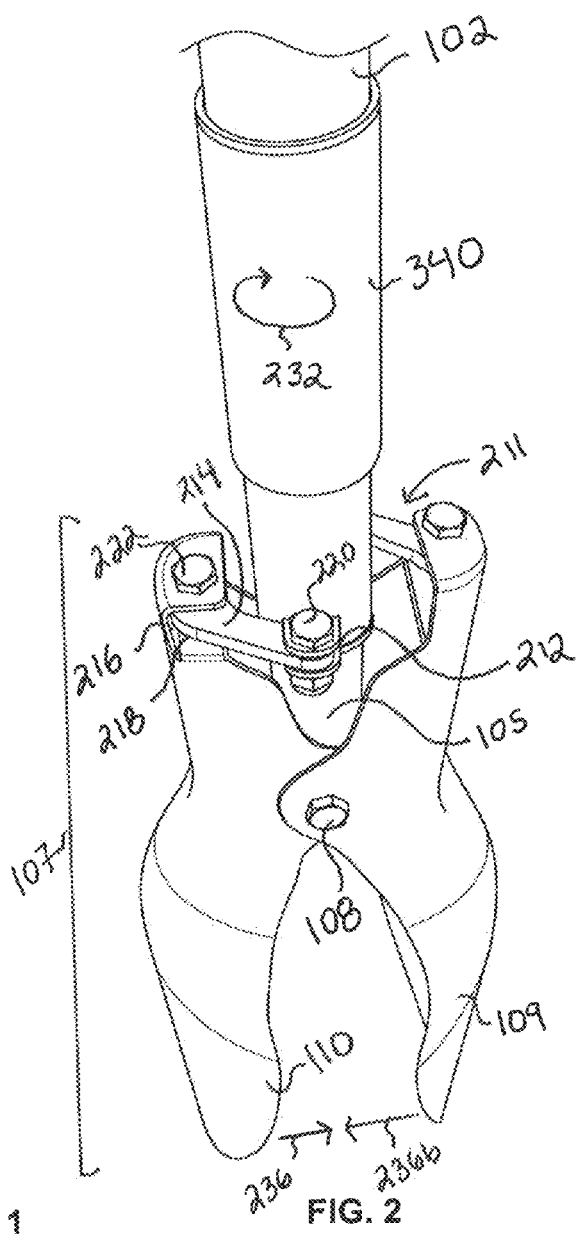
FIG. 2 shows a perspective view of aspect of the invention in an open position.
Figures 3, 4:
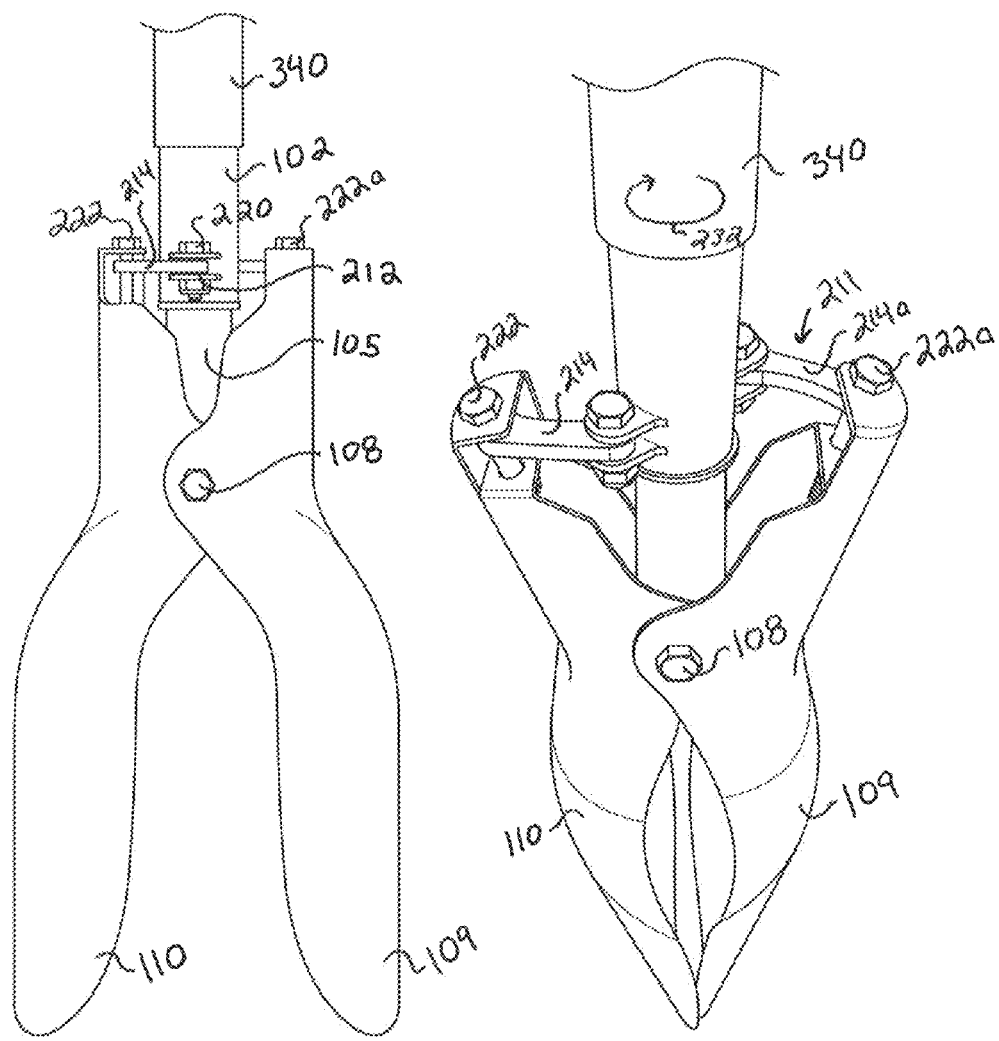
FIG. 3 shows an elevation view of aspects of the invention.
FIG. 4 shows a perspective view of aspects of the invention in a closed position.

Referring to FIGS. 2 and 3, the outer handle includes a reinforcement member 340 disposed above the blade assembly 107. In this embodiment, a sleeve pivot connection 212 is attached to the outer handle and pivotally connected to a link bar 214. The link bar is pivotally connected to one blade at blade pivot connection 216 and can be connected by a blade pin 222 that is placed through the link bar and through a link bar opening 218. The blade is pivotally connected to the inner shaft by pin 108. When the outer handle rotates about the inner shaft, in a direction shown as 232, the link bar is forced outward in a direction shown as 234 thereby causing the clevis of the blade to move in direction 234. Therefore, the blade tip moves in a direction 236 toward its closed position. In one embodiment, a second link assembly 211 includes a second sleeve pin, sleeve pivot connection, link bar, blade pivot connection and blade pin. The second blade 109 is pivotally attached to the inner shaft so that when the outer handle is turned, both blade 109 and blade 110 move between an open position and a closed position. Blade 110 can move in a direction shown as 236b when moving toward its closed position.

Referring to FIG. 4, the blades are shown in the closed position. The outer handle, once rotated as in this embodiment in direction 232, the link bars are forced outward away from the outer handle, thereby forcing the clevis of the blades outward from the outer handle. This causes the blades to pivot along pivot 108 and moves the blades toward the closed position.

Figure 5:
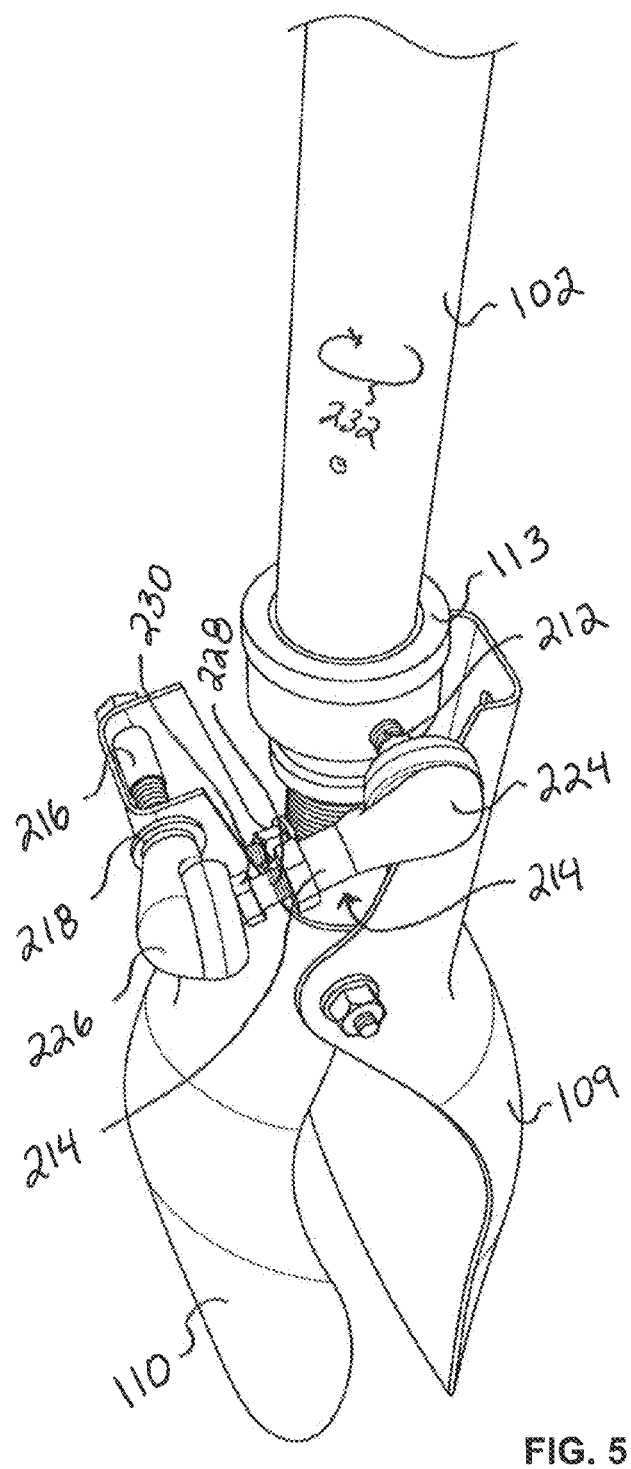
FIG. 5 shows a perspective view of aspects of the invention.

Referring to FIG. 5, one embodiment is shown, The blade assembly 107 can include a stationary blade member 109 and a movable blade member 110. The stationary blade member 109 can be attached to the inner shaft's bottom portion 105 by an adjustable pin or bolt 111 (FIG. 7) providing a means for a user to adjust the orientation angle of the stationary blade member 109 by turning the bolt 111. In one embodiment, the movable blade member 110 is connected to the outer handle 102 providing a means for a user to change the configuration of the movable blade member 110 from an open to a closed position or from a closed to an open position by rotating the outer handle 102.

Figure 6:
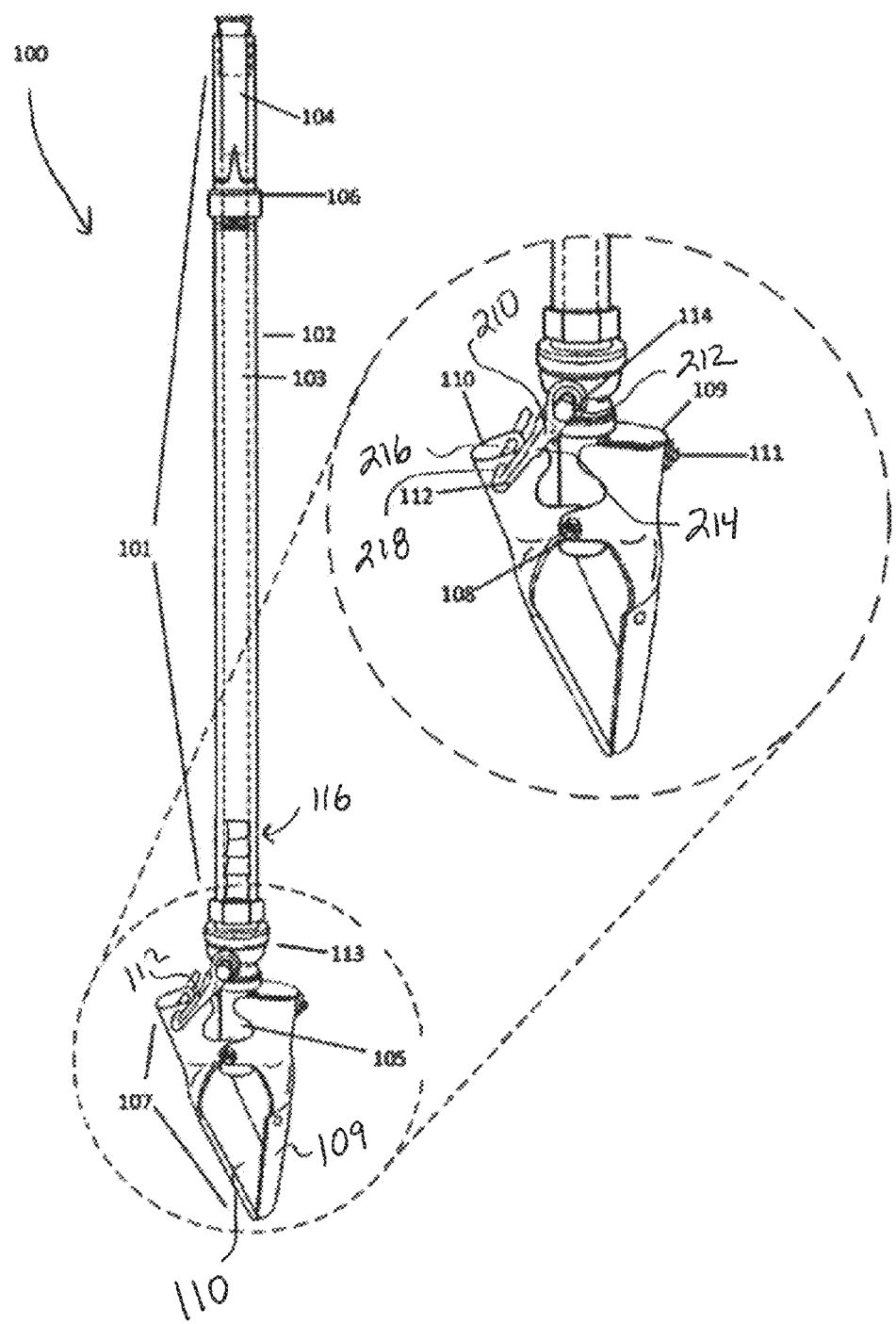
FIG. 6 shows a perspective view of the invention with aspects of the invention highlighted.

Referring to FIG. 6, one embodiment is shown with the movable blade member 110 can be secured or otherwise attached to a link bar 214. In one embodiment, the link arm can be a connection rod 112. In one embodiment, the "connection rod" 112 can be a piece of metal or plastic about 3-8 inches in length and of suitable shape to connect the top portion (sometimes called "clevis") of the movable blade member 110 to the outer handle 102 or handle connection assembly 113. It should be noted that in some examples as perhaps best shown by FIG. 6 where the connection rod 112 may be bent into an "L" shape or a "S" shape or similar type configurations known in the art to accomplish the objective of connecting the movable blade 110 to a handle connection assembly 113 or outer handle 102.

Figure 7:
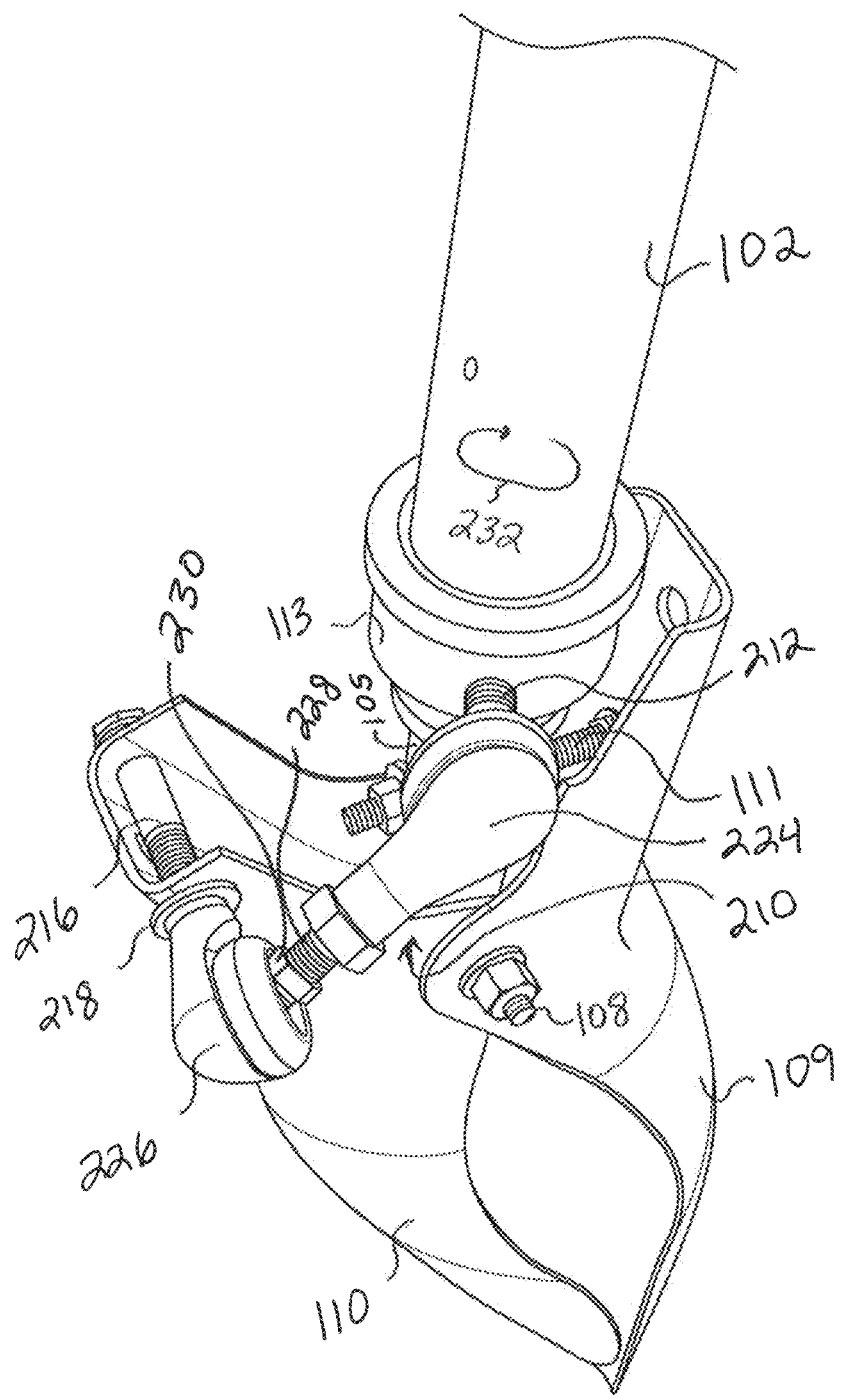
FIG. 7 shows a perspective view of aspects of the invention in a closed position.

Referring to FIG. 7, the outer handle is rotated in a direction shown as 232 in one embodiment thereby causing the linkage assembly 210 to cause line bar 214 to move outwards from the outer handle. This causes the clevis of blade 110 to move outward from the outer handle which causes blade 110 to move to its closed position. The distance that the clevis, and therefore the blade, travel can be adjusted by modifying the length of the link bar using the link spacer.

In one embodiment, the connection rod 112 is connected on one end to the clevis of the movable blade member 110 and at the other end to a handle connection assembly 113 (sometimes called a "reducer" or "pipe reducer" or "iron pipe reducer") as shown. The handle connection assembly 113 is configured to couple or otherwise connect the outer handle 102 so that the outer handle can rotate freely around the inner shaft 103. In some embodiments, the handle connection assembly 113 is connected to the outer handle 102 and also to a connection rod 112 providing a means for a user to rotate the outer handle 102 and thereby move the connection rod 112 and the movable blade member 110 between an open position and a closed position. In some embodiments, the connection rod 112 is connected directly to the handle connection assembly 113 with a connection rod attachment assembly 114 as shown in FIG. 6. In some embodiments, the connection rod 112 is connected to the outer handle at a sleeve pivot connection 212 at one end and at a blade pivot connection 216 at the clevis of the movable blade.

In one embodiment is shown where the connection rod attachment assembly 114 can include a sleeve ball and socket joint 224, a link bar 214 and a blade ball and socket joint 226. The connection of the link bar to the outer handle and blades can be accomplished by other means such as a nut and washer, or other means known in the art to connect moving pieces and allowing them some flexibility in their orientation during rotation. In some alternative embodiments, the connection rod 112 may be connected directly to the outer handle 102 instead of the handle connection assembly 113. A link spacer 228 can be included in the linkage arm to allow the length of the link arm to be modified. When the link arm is elongated, the distance that the movable blade travels can be increased allowing the blades to create a wider opening when in the open position. A link spacer lock 230 can be included so that the link bar, once adjusted for length, can be locked in place.

Figure 8:
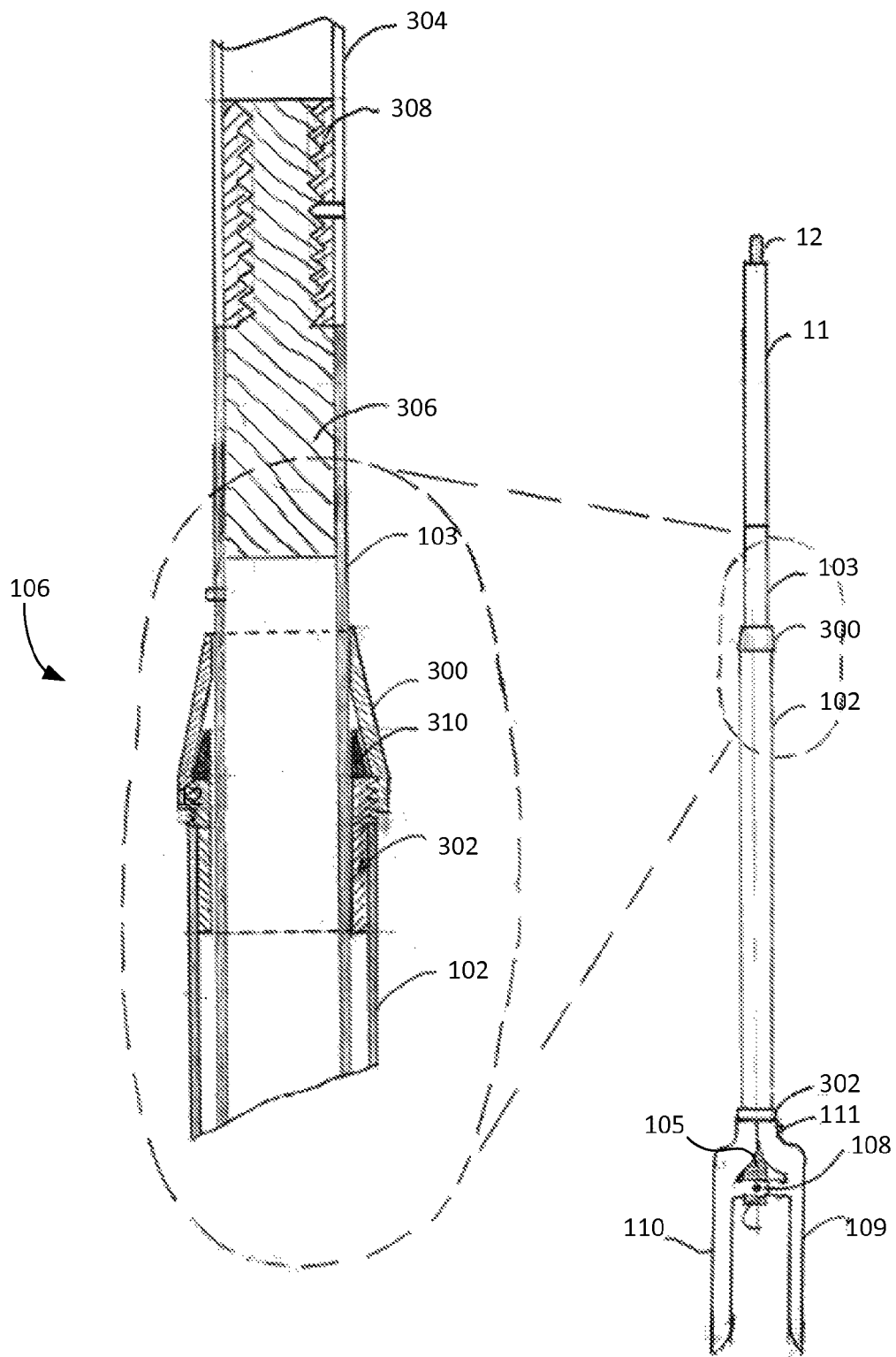
FIG. 8 shows an elevation view of aspects of the invention with aspects of the invention highlighted in a cross section view.

Referring to FIG. 8, one embodiment can include a locking assembly 106. The locking assembly 106 is configured to temporarily hold the rotating outer handle 102 in a desired position and preventing its rotation thereby also holding the movable blade 110 into either an open position or closed position. The locking assembly 106 can be located near the top or distal end of the handle assembly 101 providing easy access to a user even as the post hole digger 100 may be located deep within the ground. The locking assembly 106 can include a locking nut 300 that is rotatably carried by the inner shaft. A compression member 310 can be disposed between the outer handle and the inner shaft. A lock base 302 can be attached to the outer handle so that when the locking nut is secured to the lock base, the compression member puts force on the inner shaft thereby impeding rotation. The locking nut can be a threaded cap with a hole defined the center which is screwed onto the top or distal end of the outer handle 102 and the hole allows the inner shaft 103 to pass through the center of the threaded cap. The threaded cap when screwed onto the distal end of an outer handle 102 tightens and holds the outer handle 102 snuggly and securely against the non-rotating inner shaft 103 thereby locking both in place and ultimately locking the movable blade member 110 in its position, including an open position and a closed position.

In one embodiment, one or more extendable handle assemblies are included. In this example, an inner extension 304 is temporarily attached to the top or distal end of the inner shaft 103 thereby increasing the vertical length of the shaft. The inner extension can include a threaded portion 308 allowing the inner extension to be secured to the inner shaft.

Figure 9:
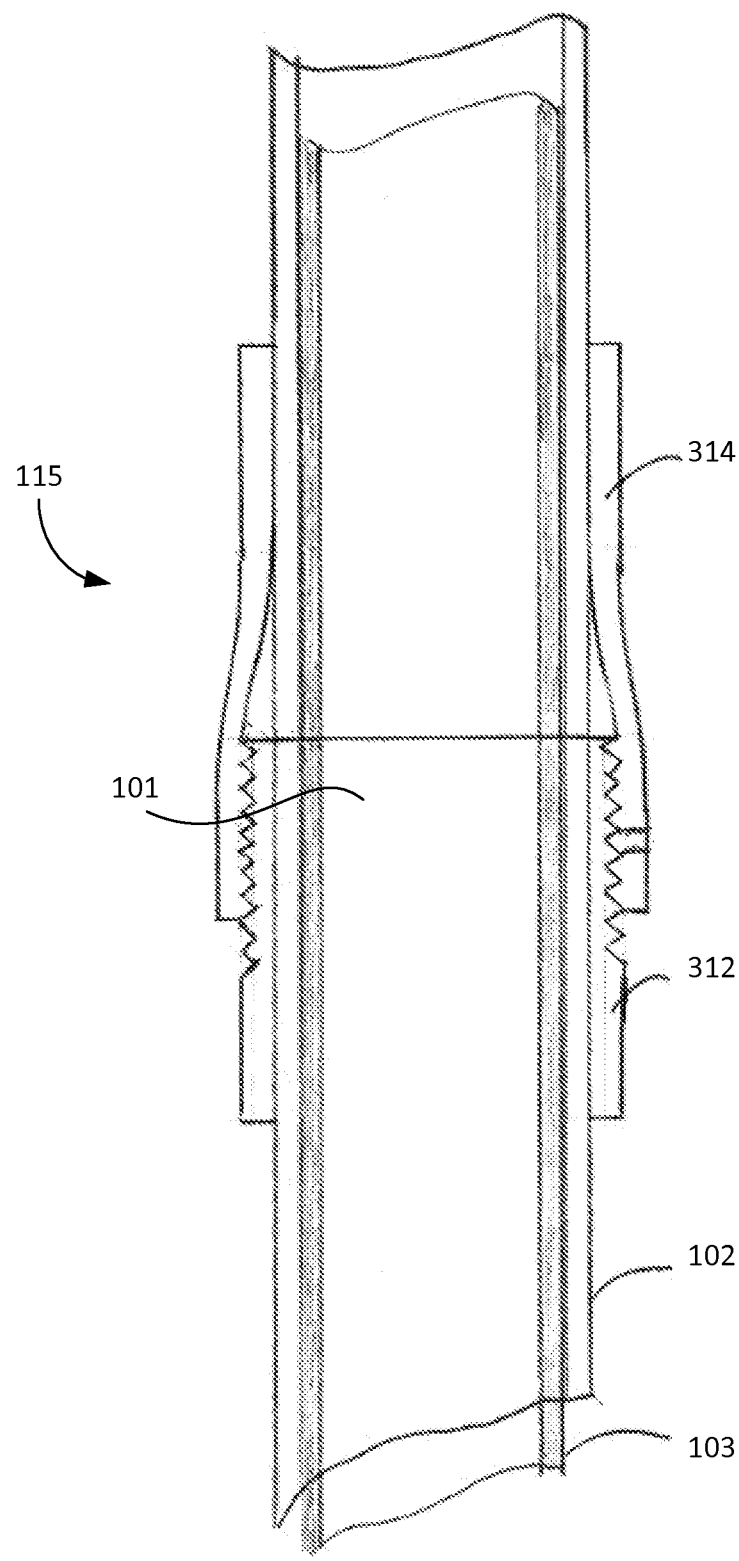
FIG. 9 a cross section view of aspects of the invention.

Referring to FIG. 9, an outer extension 314 can be temporarily attached to the outer handle 102 thereby increasing its vertical length. Some examples of means to attach the handle extension members to the inner shaft 103 and outer handle 102 include but are not limited to threading on both pieces allowing them to be screwed onto one another, using pressure to create a forced fit of the two pieces, using a snap or spring-loaded button, as well as various other means known in the art to connect two elongated shafts. An outer handle extension connector 312 can be attached to the outer handle allowing the outer extension 314 to be secured to the outer handle. In one embodiment, the present invention provides a means for a user to connect more than one extension assemblies 115 to the top or distal end of the single handle 101 of the post hole digger. This unique feature of this embodiment of the invention creates a post hole digger of practically unlimited length and allows a user to dig very deep and narrow holes for posts, wells, or other objects. In an alternative embodiment, the extension assembly 115 as contemplated herein may include a single extension member configured to connect simultaneously to both the inner shaft 102 and outer handle 103. This single unit may be extended in length by connecting additional single units.

Referring to FIGS. 6 and 7, in some embodiments, the post hole digger of the present invention comprises a means to adjust the cutting or digging angle of the blade assembly 107. Stationary blade 109 is shown connected to the bottom end of elongated inner shaft 105 through an adjustable pin or bolt 111. A user may adjust the orientation or cutting angle of the stationary blade 109 by turning the adjustable pin or bolt 111. The adjustable pin or bolt 111, in one example, is a metal threaded bolt connected on one end to the inner shaft 105 and on the other end to the clevis of the stationary blade 109. In this example, by turning the bolt in one direction, the top clevis of the stationary blade 109 is forced closer to the bottom portion of the inner shaft 105 thereby changing its orientation angle towards the ground. This unique feature allows a user to cut or dig holes of varying shapes.

In one embodiment, the post hole digger has two hollow handle assemblies, one handle assembly being located inside (the "inner shaft") and the other handle assembly (the "outer handle") and both handles being located on the same plane on a longitudinal axis, a rotating connecting assembly, referred to as an iron threaded reducer (or "handle connection assembly"), coupling two handle assemblies indirectly together, and also serving as a pivot point to open and close a single spade assembly by means of a connecting rod which is coupled between the rotating iron threaded reducer and the top of one single spade assembly near the clevis. In this example, the invention has a spade assembly having two spade members, one spade coupled to the smaller and inner handle assembly, such that it remains permanently stationary on a plane equal to or close to the plane of both handle assemblies, with the option of being adjusted such that the arc of the spade can be opened or closed in a range of 1-20 degrees by means of an adjusting pin. The second spade member is coupled to the stationary blade member by means of an offset pivot point allowing the second spade member to pivot from an open position to a closed position or vice versa. A rotating iron threaded reducer is coupled to the outside handle assembly; a pin preferably 1-2" in length is horizontally coupled to the rotating threaded reducer. In one example, a 360 degree ball and joint is directly coupled to one end of the pin and a connecting rod is directly coupled to the opposite end of the ball and joint such that the opposite end of the connecting rod is directly coupled to the top of the pivotable spade member, preferably at the clevis as the outside handle assembly moves in a circular motion, the cutting edge of the second blade member will pivot a distance of several times greater. A braking device (braking assembly) is located at the top of the outside handle assembly and preferably 10" or so below the top of the inside handle assembly allowing the worker to increase or decrease pressure on the outside handle assembly by tightening or loosening a threaded cap such that the outside handle assembly becomes more and more difficult to move such that the single pivotable spade member can be locked in place.

In a further embodiment, a removable section, with a preferred length of 8-16" above the outside handle assembly (ii) is located at the top of the inside handle assembly (i), such that this removable section is removed and reattached to the top of a new extension when it is necessary to extend the length of the single handle post hole digger for digging a longer distance into the earth; the removable section comprising a 10" or so inner handle assembly section divided into (3) separate sections which are permanently coupled to one another by means of (2) connectors. The inner handle assembly is inserted into an outer handle assembly and is coupled to the inner handle assembly. The outer handle assembly has a shorter preferred length of approximately 8". The bottom of the inner handle assembly is flared for approximately 3" and has a female opening and is coupled to the top section of the inner handle assembly (i) which has a non flared end. A snap button couples the two sections in place such that the removable section and handle assemblies (i) and (ii) will remain stationary. The removable section is to allow the worker to grip the top of the removable section handle assembly while turning the lower section of the outside handle assembly (ii) to open and close the single pivotable metal spade member. The removable section is held in place by a snap button allowing the worker to remove this section, add an extension of various lengths to the inner and outer handle assemblies by means of a coupling device and reattach the removable top section handle assembly to the top of the new extension such that the entire handle assemblies (i) and (ii) and the removable section appears as a single pole on the same longitudinal axis.

Extensions of various lengths can be added to the single-team post hole digger to achieve deeper depths. For example, a 3' extension would require the addition of a 3' inner extension and a 3' outer extension. The removable section at the top of the inside handle assembly is removed, the cap at the top of the outside handle assembly can be is removed, the 3' section of the inside handle assembly can be coupled to the top of the existing inside handle assembly by means of a button snap, the 3' outer extension can be placed over the 3' inner extension and be coupled to the existing outer handle by means of a snap button located inside the non-extension section of the outside handle assembly such that both sections of handle assembly will permanently lock in place.

The top of the added inner extension is coupled to a connector which can extend 1-2 inches outside of the opening of the outside handle assembly, thus acting as a break when the cap is tightened onto the outside handle assembly. The bottom of the inside handle assembly removable extension is inserted through the hole in the cap and the removable section is coupled to the existing inside handle assembly by means of a snap button, thus allowing the cap to be screwed onto the added extended section of the outside handle member such that it now acts as a breaking device. The single-team post hole digger now will extend 3' further into the earth. Extensions can vary based on circumstances.

Figure 10:
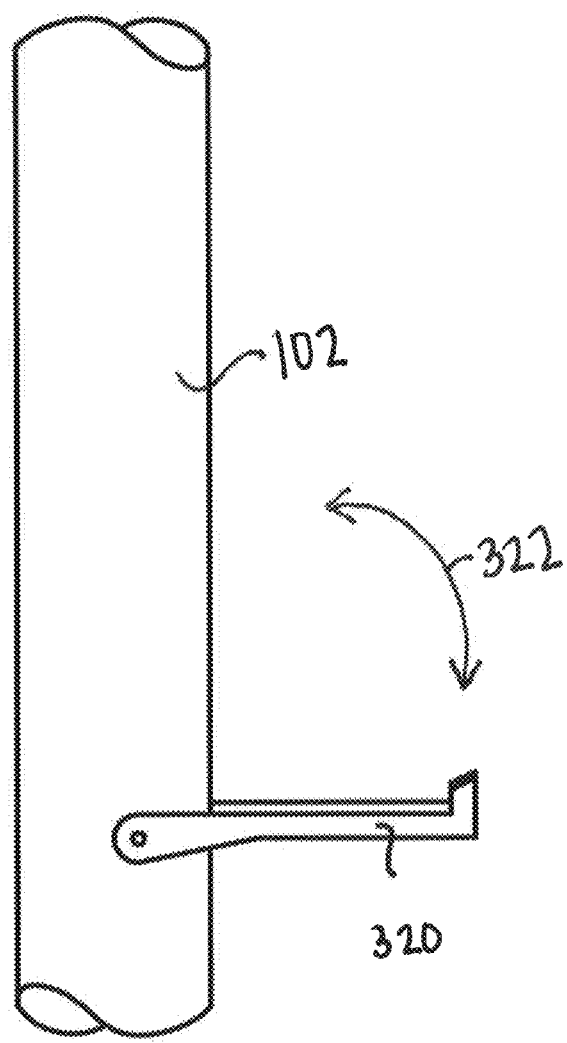
FIGS. 10 and 11 are perspective views of aspects of the invention.
Figure 11:
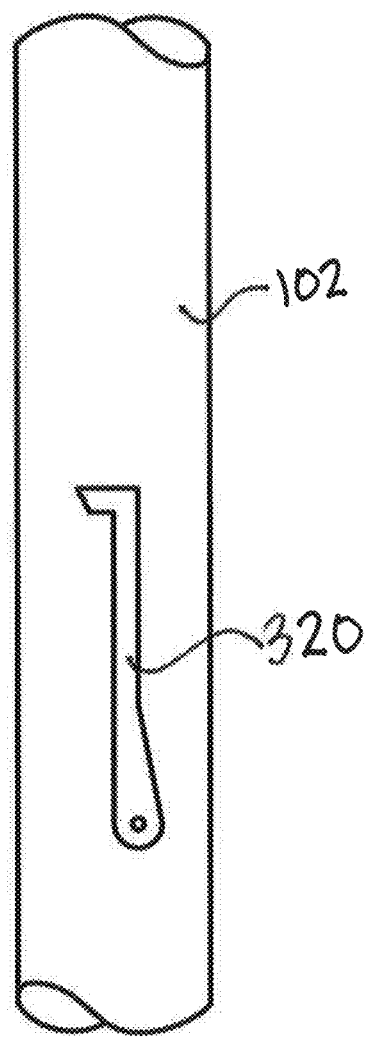

Referring to FIG. 10, a step 320 can be carried by the outer handle 102. In this embodiment, the step allows the user to place force on the step which ultimately places force on the blades allowing the blades to dig into the ground. The step can be pivotally attached to the outer handle so that it can move from an operational configuration in FIG. 10 to a stored configuration shown in FIG. 11.

Figure 12:
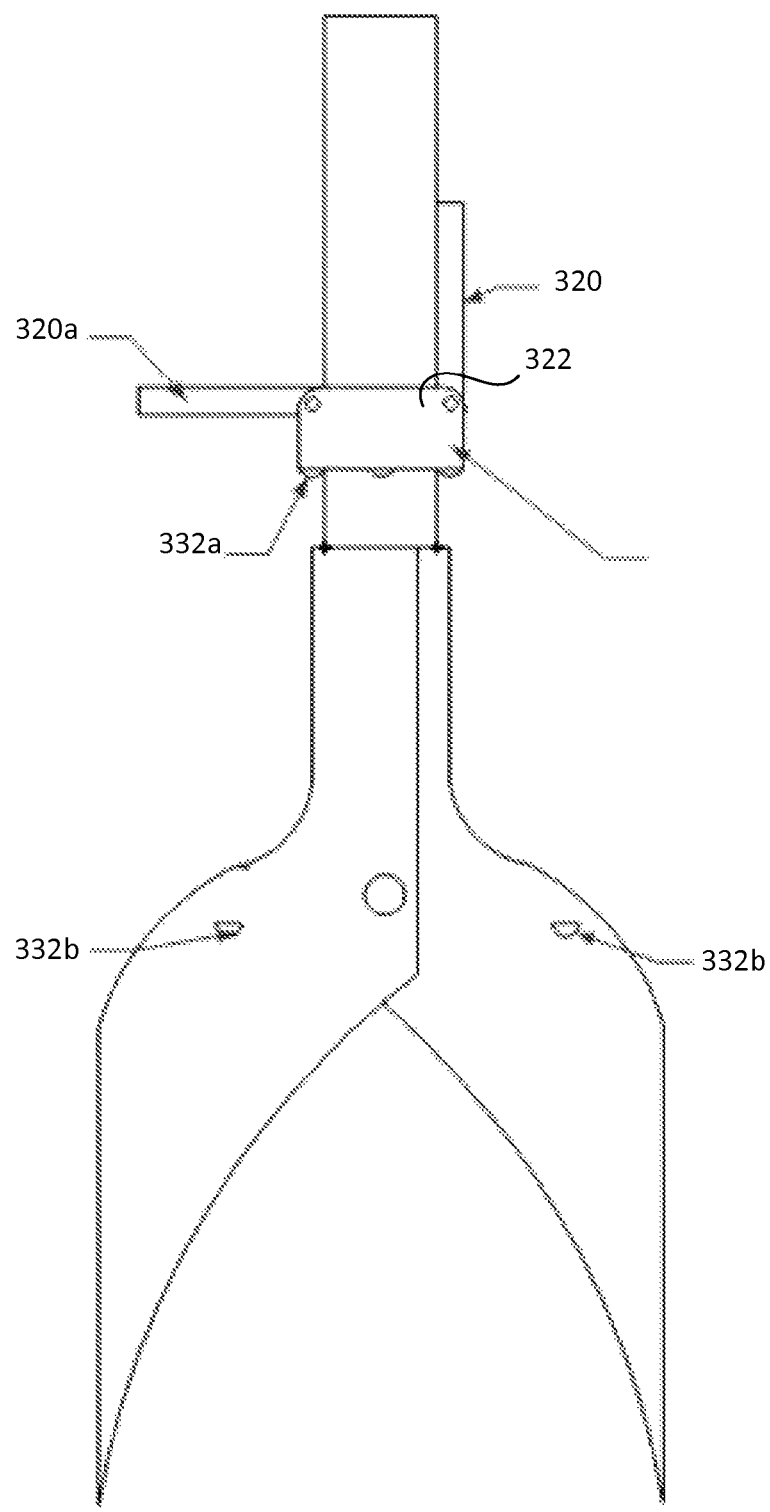
FIG. 12 is an elevation view of aspects of the invention.

Referring to FIG. 12, the step can be attached to a step connector 322 that is slidably carried by the outer handle allowing the step to be positioned at various locations along the outer handle. The step connector can carry step 320 and step 320*a*.

Figure 13:
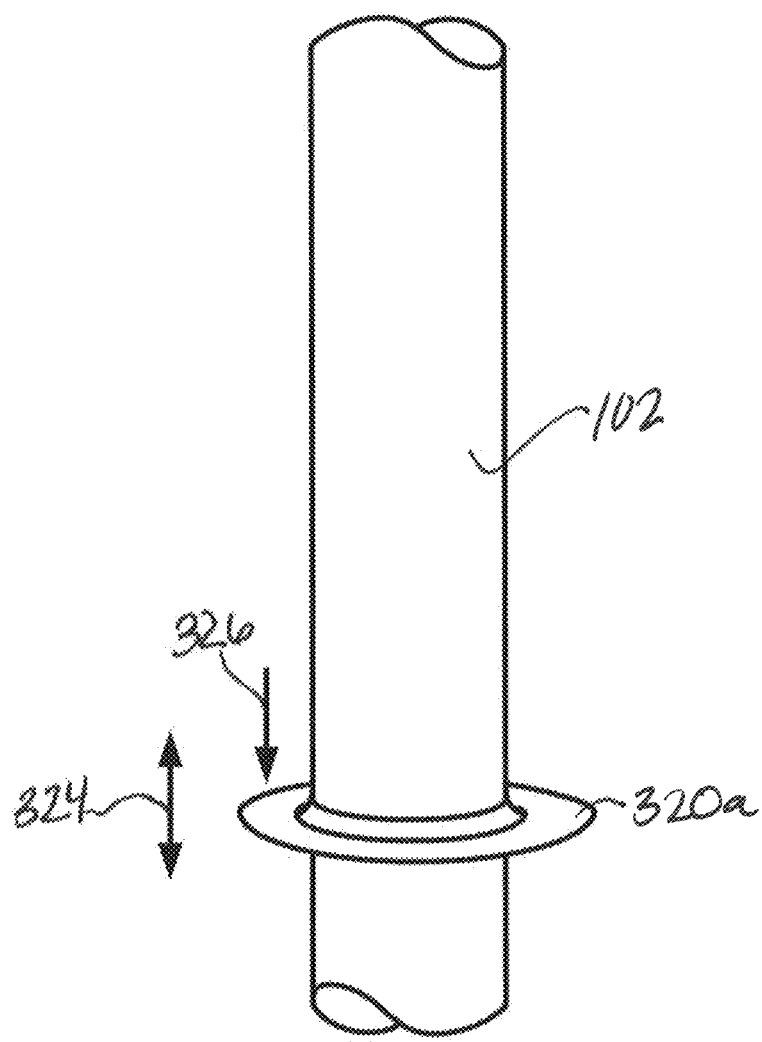
FIG. 13 is a perspective view of aspects of the invention; and,
FIGS. 14 through 19 are elevation views of aspects of the invention.

Referring to FIG. 13, a circular step 320*a* encircles the outer handle and can be positioned at various locations along the outer handle as it can slide in direction shown as 324. When force is placed on one side of the circular step, e.g. in location 326, the step is torqued so that is grabs the outer handle and does not slide downwards, but rather transfers force of the user to the blades.

Figure 14:
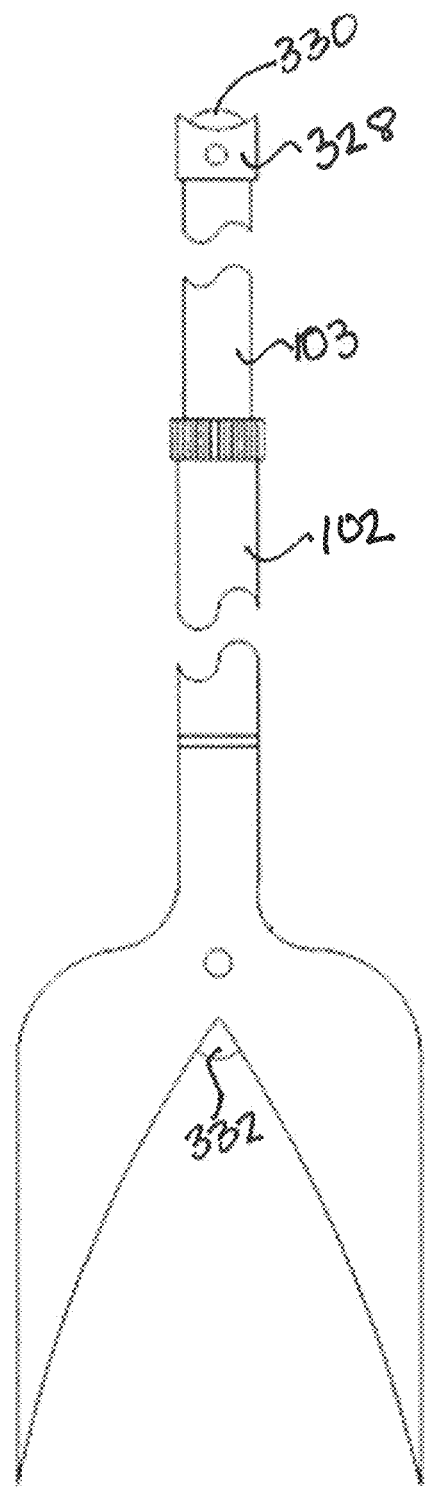

Referring to FIG. 14, the inner shaft 103 is shown disposed within outer handle 102. A switch 330 is shown integrated with a cap 328 wherein the cap can include a power supply. The cap is in electronic communication with a light 332 that can be carried by the inner shaft. Wiring can be contained with the inner shaft to provide for the electrical connection. The switch can include an accelerometer that is actuated when the blades impact the ground thereby turning on the light. The light can then be kept on for a preset period of time using a integrated circuit included in the electrical connection between the switch and the light. The integrated circuit can be disposed in the cap 328. Lights 332a can also be attached to the step connector or lights 322b can be attached to the blades as shown in FIG. 12.

Figure 15:
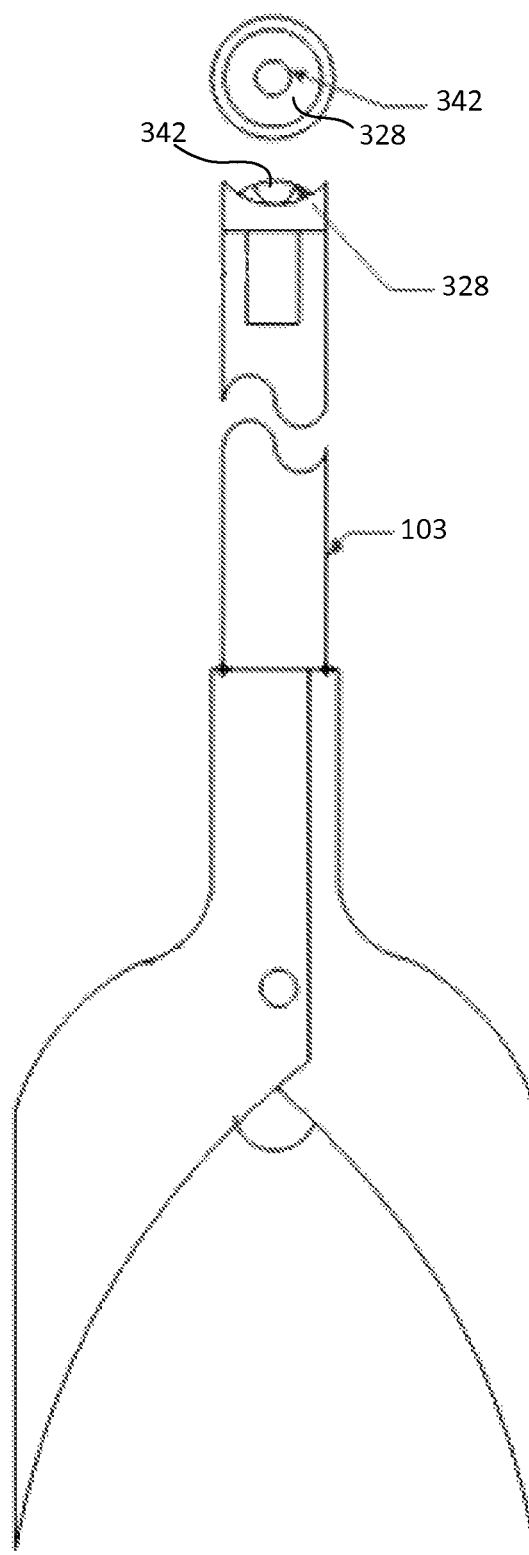

Referring to FIG. 15, a bubble level 342 can be included in cap 328 allowing the use to determine if the handle assembly is straight up to assist in digging a straight hole. This feature is particularly useful when attempting to dig a vertical hole on a hillside. The battery pack 344 can be carried in the inner shaft and in one embodiment, can be contained within the inner shaft. In one embodiment, the handle can include the physical property of being glow-in-the-dark. In one embodiment, the outer handle, inner shaft or both can be transparent and the light can be disposed with the outer handle, inner shaft or both.

Figure 16:
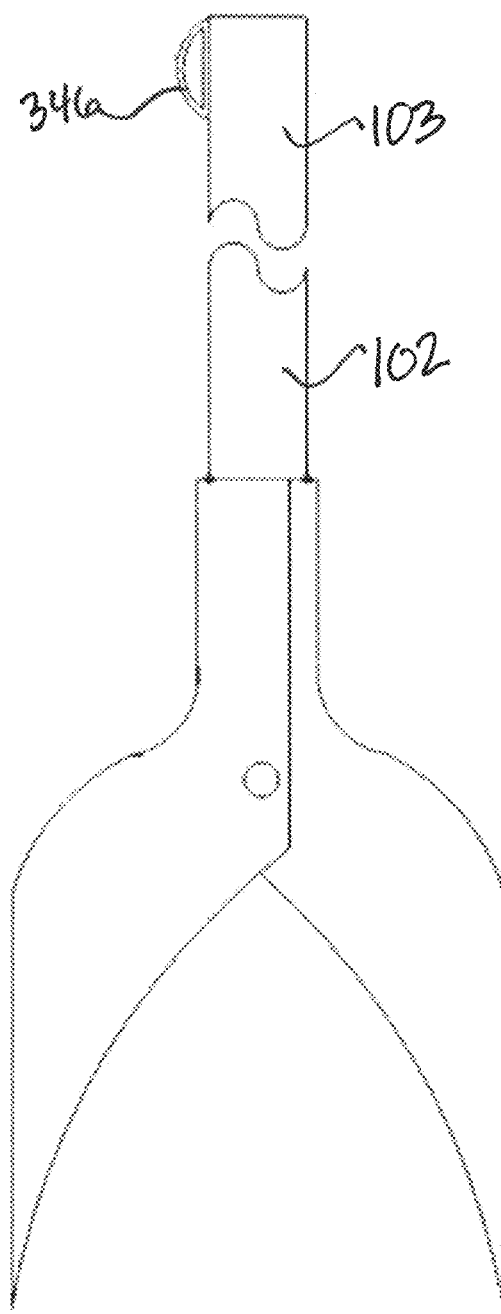

Referring to FIG. 16, a handle 346 can be attached to outer handle 103, inner shaft 102 or both allowing more force to be used to rotate the outer handle about the inner shaft.

Figure 17:
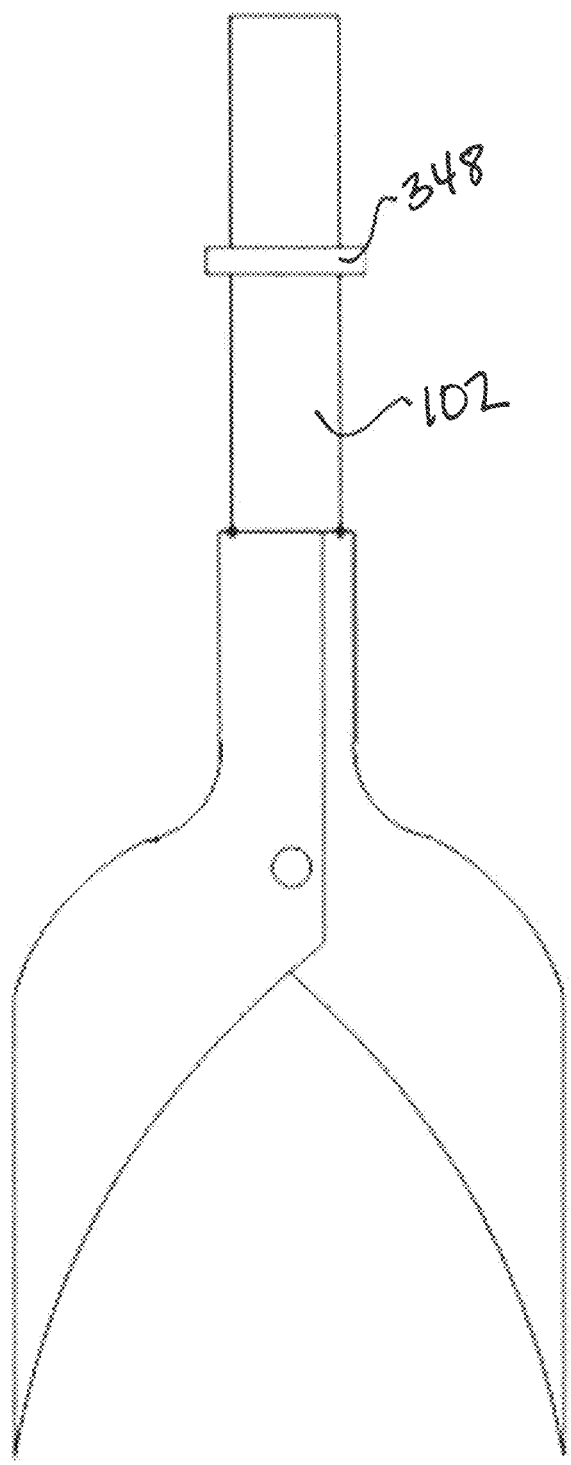

Referring to FIG. 17, a depth ring 348 can be slidably carried by the outer handle and set to a predetermined position. Therefore, the user can determine the proper depth to dig a hole by comparing the ground level with the depth ring to insure each hole is to the proper, predetermined depth.

Figure 18:
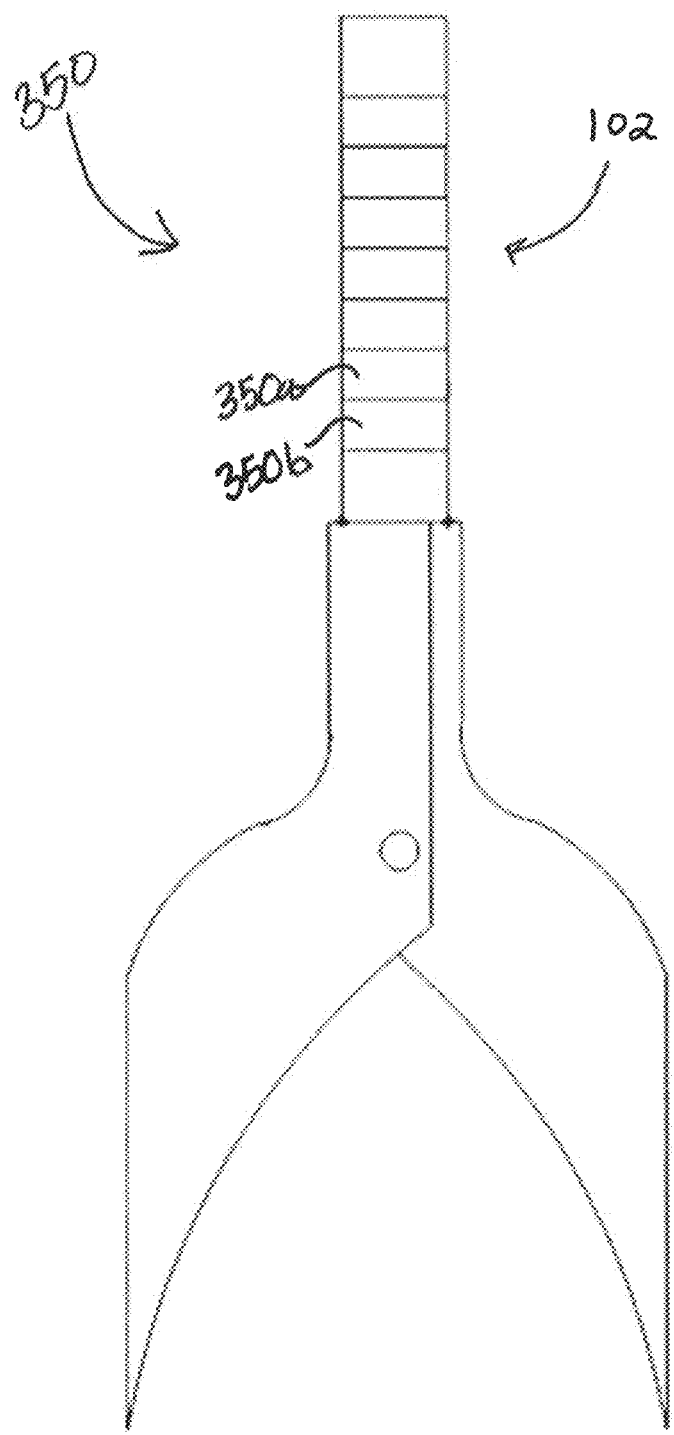

Referring to FIG. 18, outer handle 102 can include depth markings 350 in increments, for example, in inches, 6 inches and the like. In one embodiment, the markings can be bands such as 350a and 350b wherein adjacent bands are of differing colors or patterns.

Referring to FIG. 6, in some embodiments the single handle post hole digger 100 can include one or more stabilizing members 116. As used herein the term "stabilizing member" shall mean any object used to reduce the vibration and interaction between the outer handle 102 and inner shaft 103. In one example, a stabilizing member may be a piece of foam or plastic material configured to sit between the outer handle 102 and inner shaft 103 and preventing them from directly touching each other during operation of the post hole digger. A stabilizing member 116 may be for example a circular piece of plastic or foam material with an open center configured to be placed around the inner shaft 103 and act as a buffer between the inner shaft 103 and outer handle 102. The stabilizer can be placed in a void defined between the outer handle and the inner shaft when the diameter of the inner shaft is smaller than the caliber of the outer handle.

Figure 19:
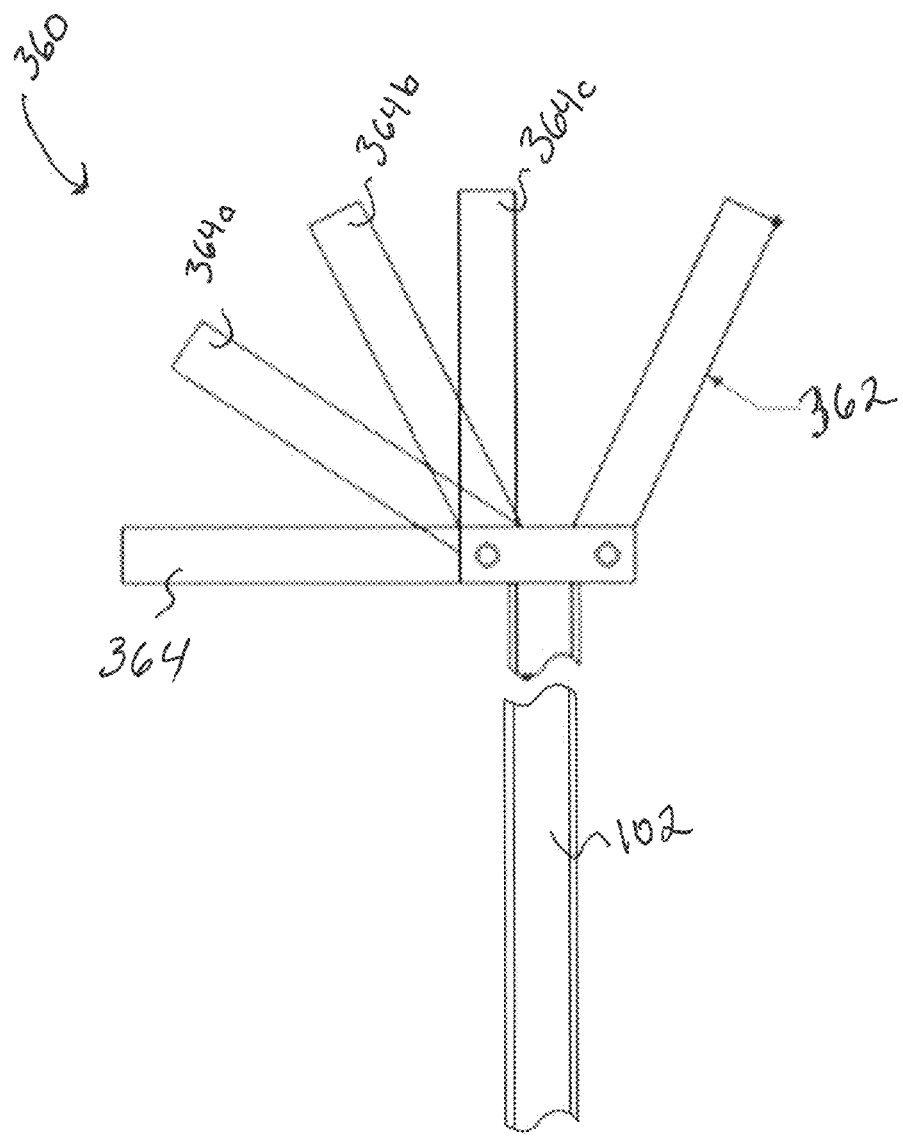

Referring to FIG. 19, one embodiment is shown with a handle 360 attached to upper distal portion 104. The handle can have one or more pivotally connected arms 362 on one side and another arm 364 on the opposite side. The arms can pivot between a horizontal position and a vertical position with examples shown as 364a through 364c. When the arms are in the horizontal position, downward force can be more easily applied to the handle assembly and transferred to the blades and rotational force can also be more easily applied to the handle assembly.

Various embodiments of the single-team post hole digger may include variations in the material, construction method, and size of the various parts used in construction. Various embodiments may also allow for variations in the design of the snap sections in the design of attaching the various parts and extensions. Various embodiments may also include additional improvements which allow an outside power source or a handle assembly arm to be used to facilitate movement of the handle assembly. Various embodiments may include additional improvements which limit vibration as well as various embodiments to allow the tool to be disassembled. Various embodiments may include different lengths of materials and adjustments on the placement of parts to accommodate these variations. Different embodiments may include the use of different handle coatings and ergonomic designs to make for easier gripping on the outside of the handle assemblies.

What is claimed is:

1. A single handled post hole digger comprising:
   a handle assembly having an outer handle having a bore for receiving an inner shaft, said inner shaft having an upper distal portion extending outwards from said outer handle and a lower portion extending outward from a proximal portion of said outer handle;
   a movable blade pivotally attached to said lower portion allowing said movable blade to pivot about said lower portion between an open position and a closed position;
   a second blade attached to said lower portion; and,
   a linkage assembly disposed between said upper distal portion and said lower portion connected to said outer handle at a sleeve pivot connection and connected to said movable blade at a blade pivot connection so that when said outer handle is rotated about said inner shaft, said movable blade moves between said open position and said closed position.

2. The apparatus of claim 1 including a link bar connected between said sleeve pivot connection and said blade pivot connection.

3. The apparatus of claim 2 including a link spacer in said link arm so that the length of said link arm can be adjusted thereby modifying the distance that the movable blade travels when moving between said open position and said closed position.

4. The apparatus of claim 1 including:
   a second linkage assembly connected to said outer handle;
   wherein, said second blade is pivotally connected to said lower portion of said inner handle so that when said outer handle is rotated about said inner shaft, said blades move between said open position and said closed position.

5. The apparatus of claim 1 including a locking assembly carried by said outer handle for locking said inner shaft thereby preventing said inner shaft from rotating within said outer handle.

6. The apparatus of claim 5 including:
   a compression member carried by said outer handle;
   a lock base attached to said outer handle; and,
   a lock nut carried by said outer handle so that when said lock nut is engaged with said lock base, said compression member presses against said inner shaft to restrict said inner shaft from rotating within said outer handle.

7. The apparatus of claim 1 including an inner extension connected to said upper distal portion thereby extending said inner handle and allowing for a deeper hole to be produced.

8. The apparatus of claim 7 including an outer extension connected to said outer handle thereby extending said outer handle and allowing for a deeper hole to be produced.

9. The apparatus of claim 1 including a step connected to said outer handle.

10. The apparatus of claim 9 wherein said step is slidably attached to said outer handle, thereby allowing said step to be positioned along the outer handle.

11. The apparatus of claim 9 wherein said step is pivotally connected to said outer handle and includes a retracted position and an extended position.

12. The apparatus of claim 9 wherein said step encircles said outer handle.

13. The apparatus of claim 1 including:
 a light source carried by said inner shaft for providing light toward said blades;
 a power source carried by said outer handle in electrical communications with said light source; and,
 a switch for actuating said light source to provide light to a working area.

14. The apparatus of claim 13 wherein said light source is attached to said lower portion of said inner shaft disposed between said blades.

15. The apparatus of claim 13 wherein said switch is an accelerometer actuated by impact of said blades against the ground.

16. The apparatus of claim 1 wherein said linkage assembly includes a ball and socket connection.

17. A single handled post hole digger comprising:
 a handle assembly having an inner shaft rotatably received into an outer handle, said inner shaft extending outwards from both ends of said outer handle;
 a movable blade pivotally attached to said handle assembly, said blade having said open position and said closed position in relation to a second blade attached to said handle assembly; and,
 a linkage assembly pivotally connected between said outer handle and said movable blade so that when said outer handle is rotated about said inner shaft, said movable blade moves between said open position and said closed position.

18. The apparatus of claim 17 including a second linkage assembly connected between said outer handle and said second blade so that when said outer handle is rotated about said inner shaft, said blades move between said open position and said closed position.

\* \* \* \* \*